United States Patent Office 3,502,427
Patented Mar. 24, 1970

3,502,427
PROCESS FOR THE PRODUCTION OF ADSORBENT CARBON AND REMOVAL OF SULFUR DIOXIDE, SULFUR AND NITROGEN OXIDES FROM GASES
Friedrich Johswich, Essen, Germany, assignor to Chemiebau Dr. A. Zieren G.m.b.H. & Co. KG, Cologne, Germany, a German company
No Drawing. Filed July 13, 1965, Ser. No. 471,742
Claims priority, application Germany, July 15, 1964, R 38,382
Int. Cl. C01b 31/08; B01d 53/02
U.S. Cl. 23—2
6 Claims

ABSTRACT OF THE DISCLOSURE

A process for the production of an activated carbon for removal of sulfur, sulfur oxide or nitrogen oxide from a gas stream and a process for removing these components from the gas stream wherein an acid residue of petroleum refining, treated with sulfuric acid, is subjected to coking at 300° C. to 600° C. to form an acid coke which is heat-treated in the absence of air at 800° C. to 1000° C. to increase porosity and absorptive capacity. The adsorptive capacity of the substance is increased further by subjecting it to at least four adsorption-desorption cycles wherein the acid coke is used to adsorb sulfur oxides from a gas stream at a temperature below 200° C. and the adsorbed materials are desorbed therefrom at a temperature above 300° C.

---

The present invention relates to activated carbon and more specifically to activated carbons prepared from the waste products from petroleum refineries.

In completely carbonized or cokefied carbonaceous materials, hereinafter referred to as "semi-cokes," have been used in the purification of industrial or waste gases, as described, for example, in my copending application Ser. No. 353,922, filed Mar. 23, 1964 (now U.S. Patent 3,284,158). They are particularly effective in the removal of sulfur and nitrogen oxides from combustion gases. Semi-cokes, additonally, have the property of being further activated by the process of repeated adsorption and desorption of the gases. The semi-cokes used heretofore were generally prepared by partial cokefication of combustible organic materials such as wood, coal and the like.

Semi-cokes can be activated to the point that they are suitable for the recovery and purification of liquids (e.g. solvents and the adsorptive purification of gases). The semi-cokes adsorb sulfur-dioxide and sulfur-trioxide vapors at temperatures generally below 200° C. from the gaseous phase and they will desorb (i.e. evolve) these vapors at temperatures of 300° C. and higher. It has been found that the adsorptive efficiency and capacity of these activated carbons increases after several such adsorption desorption cycles. Semi-cokes evidencing such improvement upon cycling can thus be referred to as self-activating carbons.

Semi-cokes which in the past have been found to be useful for sulfur and nitrogen oxide adsorption have been those derived from anthracite, bitumenite, lignite, peat, wood, etc. These materials are coked at temperatures below 700° C. with the cokefication treatment being terminated prior to complete carbonization. Generally, the particular semi-coking treatment used depends on the particular raw material and the specific qualities desired. It is possible by varying the semi-coking operation through art-recognized expedients to establish the desired particular grain size, resistance to abrasion, porosity, activity of the inner surfaces, total inner and outer surface areas etc.

It is an object of this invention to produce improved activated carbons for the adsorptive treatment of gases from inexpensive raw materials.

It is a further object to provide a process for producing self-activating carbons with high specific surfaces (i.e. ratio of total surface area to volume or weight).

These and ancillary objects are achieved by a unique high-temperature coking treatment of acid semi-cokes derived from the refining of petroleum. Acid semi-cokes suitable for use with this invention are obtained by the conventional techniques from the treating of the crude oil for petroleum residues with sulfuric acid and then heating the mass to temperatures in the range 300–600° C. until the major portion of the sulfur-containing impurities are removed. The acid semi-cokes are primarily derived from the coking of the acid resins, tars and other viscous residues. The coking operation being carried out in rotating coking drums heated to temperatures in the aforementioned range of 300–600° C. The sulfuric acid used is to a large part recovered and the acid-coke is a residue used mainly as a combustible for heating boilers and industrial furnaces. These acid cokes consist primarily of spheric aggregations of carbon and may contain as much as 15% by weight sulfuric acid. They have a glasslike structure and a poorly developed internal-surface area. They have almost no adsorbent activity for sulfur and nitrogen oxides and consequently are not, as recovered, to be considered as self-activating.

The acid cokes are converted to self-activating adsorptive carbons in accordance with this invention by a further heat-treatment or coking of this material at temperatures between 800 and 1000° C. At these elevated temperatures, surprisingly enough, it has been found that the glasslike structure is altered and that internal pores develop in the carbonaceous grains. The activated carbon resulting from this heat treatment has sufficient porosity, a suitable internal-surface structure and area to be used for adsorption as previously described. Further it has been found that the activated carbon resulting from the process of this invention improves in adsorptive capacity after the initial heat-treatment by a further treatment consisting of repeated adsorbing and desorbing cycles with sulfur oxides. The oxides are adsorbed at temperatures below 200° C. and desorbed at temperatures above 300° C.

The activated carbons of this invention have an excellent packing density despite their favorable internal structure. Their packing density (loose specific gravity) ranges between 0.50 to 0.60 t./m.³. This compares favorably with the peat semi-cokes heretofore used. Such peat-derived material has a packing density of 0.30 to 0.35 t./m.³. Both materials adsorb approximately 5 to 15% by weight of sulfur oxides when fully activated. When one considers that the capacity of the particular adsorbent is measured by the weight of sulfur oxides adsorbed per unit weight of adsorbent, the relative efficiency of the activated carbon prepared according to this invention is almost twice as great. Since the adsorption process is carried out in tubes or towers of constant volume, the advantages of the higher packing density of the activated carbon according to this invention is readily apparent.

The following example provides comparative data concerning the ability and advantages of the material and processes according to this invention. The example, of course, represents merely one mode of realizing this invention and is not intended to be limiting. Thus, the invention may be successfully practiced under any coking conditions if the acid coke is heated within the range of 800 to 1000° C. in the presence of nitrogen or other inert gas, but preferably in the absence of air.

EXAMPLE

Three different samples, peat semi-coke (sample I), untreated acid coke (sample II), and treated acid coke (sample III), all having approximately the same grain size (4–6 mm.) were subjected to comparative $SO_2$-adsorption tests. A sample layer, having a circular cross-section of about 5.3 cm.$^2$ and a length of about 60 cm. was flushed by an air stream containing about 4 gm. of $SO_2$ per m.$^3$ (STP) at ambient temperature. The flow was continued until traces of $SO_2$ were detected at the outlet end of the column. The average weight of the adsorbed $SO_2$ was determined and expressed as the percentage by weight of the adsorbent in the test layer. Four samples of each of the three materials were comparatively tested as follows:

(a) without activation
(b) after two activations
(c) after four activations
(d) after eight activations The individual activations were effected by 10-hour air-streaming of the individual samples with air containing about 10 g. $SO_2$/m.$^3$ at ambient temperature and subsequent expulsion of the adsorbed $SO_2$ at about 400° C. in a nitrogen stream.

The following materials were tested:

(I) Peat semi-coke in the state as delivered from the low-temperature carbonization installation. This is the material that is typically used industrially as adsorbent peat semi-coke. The carbonization (coking) temperature was below 700° C. This sample of peat semi-coke has a packing density of 0.32 t./m.$^3$. The sample layer in the packed tube of the experimental apparatus weighed 102 g.

(II) Acid coke without pretreatment. This is the petroleum-residue material as made available by the Norddeutsche Refinerie of Hamburg. It was typical of the acid cokes resulting from normal acid-coking operations. The acid coke has a packing density of 0.65 t./m.$^3$ and the test layer sample weighed 206 g.

(III) Pretreated acid coke. The material from the same batch as per II was subjected to a two-hour heat treatment in the absence of air (under coking conditions). The packing density of this material is 0.56 t./m.$^3$ and the test sample weighed 178 g.

The following table indicates the percentages by weight of adsorbed sulfur dioxide as related to the weight of the individual samples. The end point of the experiment was the first breakthrough of $SO_2$ at the outlet of the experimental apparatus.

TABLE

| Number of activations | Average breakthrough charge of active coke samples in percents by weight | | |
|---|---|---|---|
| | Sample I | Sample II | Sample III |
| (a) 0 | 0.9 | 0.1 | 0.5 |
| (b) 2 | 2.3 | 0.3 | 1.6 |
| (c) 4 | 3.5 | 0.5 | 2.8 |
| (d) 8 | 4.9 | 0.8 | 4.6 |

The results show conclusively that the untreated acid coke can barely be activated and is hardly adsorbent. The coke (sample III) treated according to this invention, by contrast, is practically equivalent to peat coke in adsorption efficiency based on unit weight and fully 75% superior based on unit volume of the material. It will therefore require less cumbersome apparatus to achieve the adsorption of the same amount of gas.

The same relative efficiencies of the peat coke and the activated carbon of this invention are obtainable with nitrogen oxides, and reducing sulfur compounds such as hydrogen sulfide, carbon disulfide, carbon oxysulfide and sulfur vapor.

It has also been observed that anthracite and lignite semi-cokes are similar to the peat semi-coke of the example as regards efficiency of adsorption and self-activating characteristics.

The removed adsorbent carbon prepared in accordance with the specific example and especially with reference to Example III can then be used as the adsorber in the method and apparatus described and claimed in my copending application Ser. No. 353,922, filed Mar. 23, 1964 (U.S. Patent No. 3,284,158). In general, the methods in which the adsorbent carbon is employed will provide for adsorption of the sulfur-containing compound at temperatures ranging from ambient to 200° C., while the desorption is carried out at temperatures between substantially 300 and 500° C. The adsorption step is preferably effected in the presence of an oxygen and water vapor containing medium. Metal salts or other catalytically active substances can be combined with the active carbon to increase the oxidation of the adsorbed material, while the adsorption and the desorption steps are repeated as the active carbon is circulated along a closed path; additional quantities of activated carbon can be supplied to the circulating mass thereof to compensate for any losses.

I claim:

1. A method of removing sulfur, sulfur compounds and nitrogen oxides from a gas stream which comprises the steps of:
    (a) heat-treating a glassy surfaced acid-coke petroleum-refining residue containing sulfuric acid and having a relatively low porosity, small internal-surface area and low adsorptive capacity at a temperature of substantially 800° C. to 1000° C. for a period sufficient to render said acid coke highly porous and impart thereto at least a several-fold increase in adsorptive capacity;
    (b) passing an impure gas stream through a column of the acid coke treated in step (a) at a temperature of substantially 20° C. to 200° C. to permit said column to adsorb sulfur, sulfur compounds and nitrogen oxides from said gas stream and produce a column of acid coke laden therewith,
    (c) heating the column of said acid coke laden with sulfur, sulfur compounds and nitrogen oxides following step (b) to a temperature between substantially 300° C. and 500° C. to desorb the previously adsorbed substances from the column; and
    (d) recirculating the acid coke subjected to desorption in step (c) to step (b) for re-use in the treatment of further quantities of impure gas.

2. The method defined in claim 1 wherein the adsorption step (b) is carried out in the presence of an oxidizing medium selected from the group consisting of oxygen and steam.

3. The method defined in claim 1 wherein the treatment of the acid coke in step (a) is carried out in the absence of air.

4. The method defined in claim 1 wherein the adsorption-desorption cycle including steps (b) and (c) is repeated at least four times.

5. A process for the production of activated carbon material suitable for removal of sulfur oxides or nitrogen oxides from a gas stream containing same, said process consisting of the steps of
    coking acid residues obtained by treatment of petroleum products with sulfuric acid at a coking temperature in the range of 300° C. to 600° C. whereby an acid coke is formed and sulfuric acid is removed therefrom;
    heat-treating said acid coke at a temperature between 800° C. and 1000° C. in the presence of an inert gas for a period sufficient to increase internal surface area and the adsorptive capacity of the acid coke;
    adsorbing sulfur oxides from a gas stream on said heat-treated acid coke by subjecting same to said gas stream at a temperature below 200° C.;
    desorbing said sulfur oxides from the coke by heating same to a temperature above 300° C. in a nonreactive atmosphere; and repeating this adsorption-desorption sequence at least four times whereby the adsorptive capacity of the acid coke is further increased.

6. A process for the production of activated carbon material suitable for removal of sulfur oxides or nitrogen oxides from a gas stream containing same, said process consisting of the steps of coking acid residues obtained by treatment of petroleum products with sulfuric acid at a coking temperature in the range of 300° C. to 600° C. whereby an acid coke is formed;

heat-treating said acid coke at a temperature between 800° C. and 1000° C. in the presence of an inert gas for a period sufficient to increase internal surface area and the adsorptive capacity of the acid coke;

adsorbing sulfur oxides from a gas stream on said heat-treating acid coke by subjecting same to said gas stream at a temperature below 200° C.; and desorbing said sulfur oxides from the coke by heating same to a temperature above 300° C. in a nonreactive atmosphere.

References Cited

UNITED STATES PATENTS

| 2,718,505 | 9/1955 | Baker et al. | 252—421 |
| 2,635,709 | 4/1953 | Archibald et al. | 252—445 X |
| 2,992,895 | 7/1961 | Feustel et al. | 23—2 X |
| 3,112,181 | 11/1963 | Petersen et al. | 23—209.1 |

FOREIGN PATENTS 789,663  1/1958  Great Britain.

OSCAR R. VERTIZ, Primary Examiner

E. C. THOMAS, Assistant Examiner

U.S. Cl. X.R.

23—161, 178; 252—445